Figure 1:
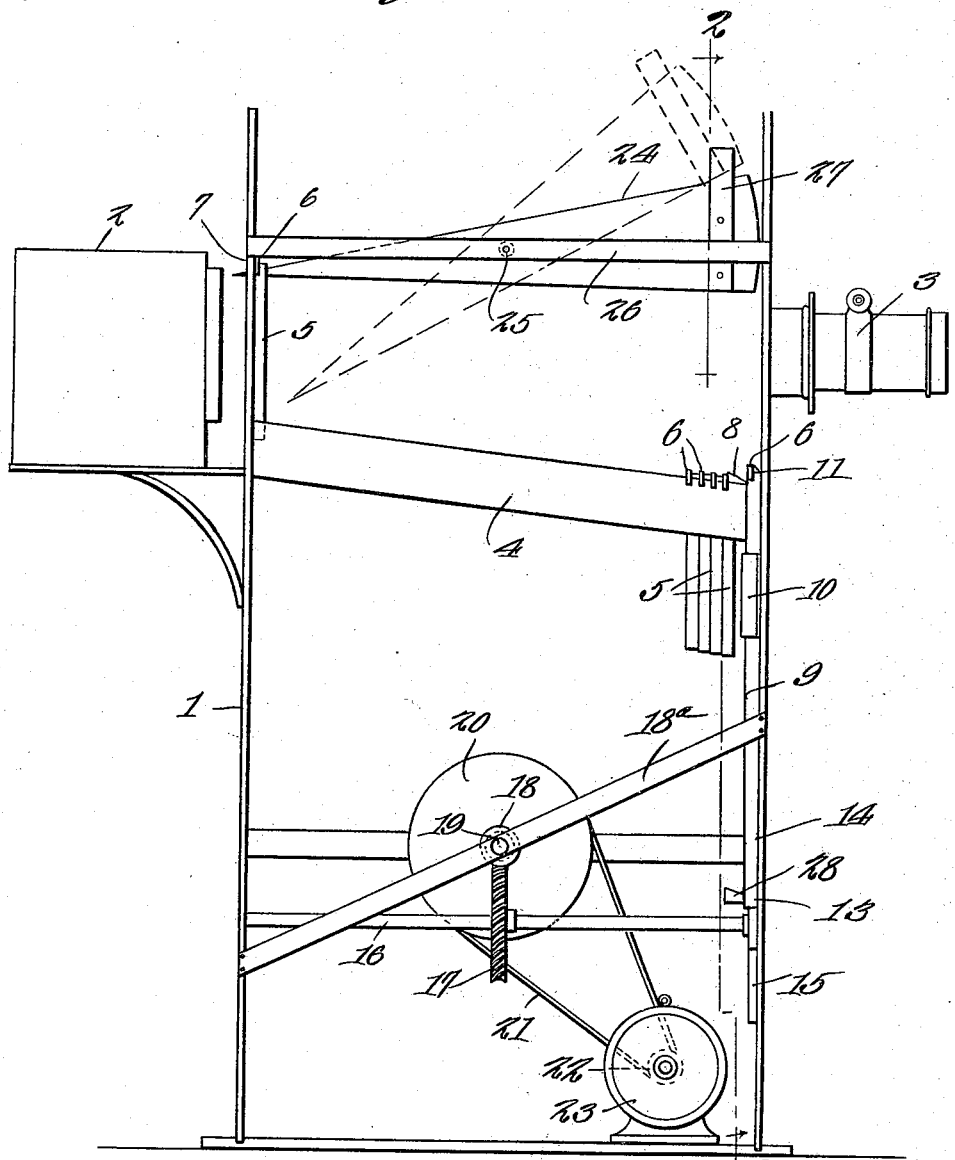

W. C. JOHNSON.
SLIDE PRESENTING MACHINE.
APPLICATION FILED OCT. 18, 1915.

1,203,744.

Patented Nov. 7, 1916.
2 SHEETS—SHEET 1.

Witnesses

W. C. Johnson Inventor,
by C. A. Snow & Co.
Attorneys.

W. C. JOHNSON.
SLIDE PRESENTING MACHINE.
APPLICATION FILED OCT. 18, 1915.
1,203,744.
Patented Nov. 7, 1916.
2 SHEETS—SHEET 2.
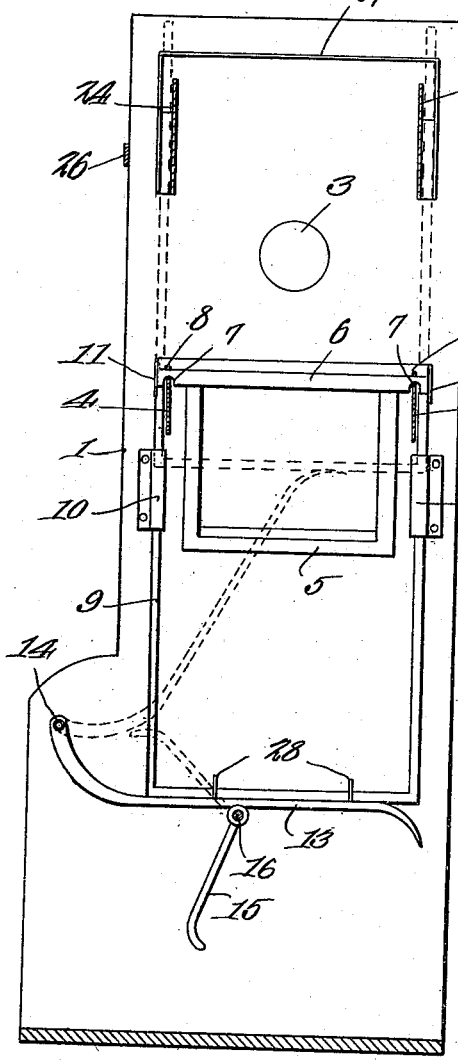
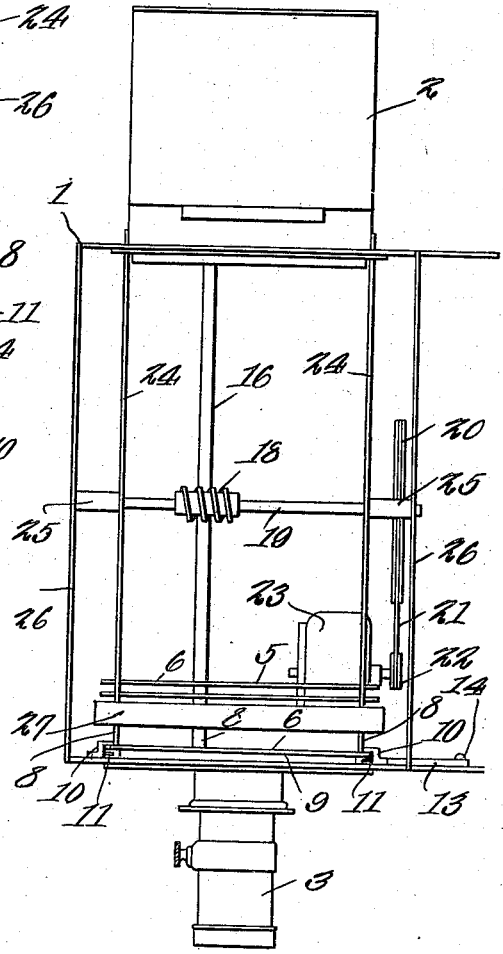
Witnesses
W. C. Johnson
Inventor,
by C. A. Snow & Co.
Attorneys.

UNITED STATES PATENT OFFICE.

WALLACE C. JOHNSON, OF NEVADA, MISSOURI, ASSIGNOR OF ONE-FOURTH TO DIXIE L. HAGGARD AND ONE-FOURTH TO JOE E. HAGGARD, OF KANSAS CITY, MISSOURI, AND ONE-FOURTH TO WILSON J. CECIL, OF NEVADA, MISSOURI.

SLIDE-PRESENTING MACHINE.

1,203,744.  Specification of Letters Patent.  Patented Nov. 7, 1916.

Application filed October 18, 1915. Serial No. 56,576.

*To all whom it may concern:*

Be it known that I, WALLACE C. JOHNSON, a citizen of the United States, residing at Nevada, in the county of Vernon and State of Missouri, have invented a new and useful Slide-Presenting Machine, of which the following is a specification.

The present invention appertains to slide presenting machines, and aims to provide a novel and improved mechanism for automatically presenting a series of stereopticon slides one at a time between a lantern house or source of light and a lens, so that the slides will be brought into place in succession without manual attention, thus relieving the operator of this duty and saving time and trouble, and furthermore, assuring of the presentation of the slide for a definite period.

It is also within the scope of the invention to provide a mechanism of the nature indicated which is comparatively simple and inexpensive in construction, and which is efficient and practical in operation, it being possible to insert and remove the slide carriers at will without interfering with the operation of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a side elevation of the machine illustrating the parts in normal position in full lines, and illustrating the pivoted slide ways or slide rails swung to slide releasing position in dotted lines. Fig. 2 is a vertical section taken on the line 2—2 of Fig. 1 with the parts in normal position, and illustrating the elevator raised in dotted lines. Fig. 3 is a plan view of the mechanism.

In carrying out the invention, there is provided an upright frame of suitable construction, the rear wall of which carries a lantern house or other source of light 2, while the front wall of the frame carries the projecting lens 3 in line with the lantern house 2, although it is to be understood that the present device may be disposed between any suitable source of light and a projecting lens, the mechanism being used either as a stereopticon, or as a stereopticon attachment whichever is desired.

The frame 1 includes a pair of inclined slide rails 4 at the sides thereof and slightly below the horizontal axis of the lens 3 and source of light, the rails 4 being inclined so that their rear ends are higher than their forward ends. The ends of the rails 4 are secured in any suitable manner to the front and rear walls of the frame. Disposed between the rails 4 is a suitable number of slide carriers 5, each of which has secured thereto in any suitable manner, a stereopticon slide. The carriers 5 are provided with upper horizontal suspension bars 6 having protruding ends resting slidably upon the rails 4, whereby the slide carriers 5 are suspended between the rails. The projecting ends of the bars 6 have lower notches 7 receiving the upper edges of the rails 4, whereby the slide carriers will slide downwardly properly upon the rails 4 without the liability of the carriers becoming displaced. The lower ends of the rails 4 are provided with upstanding V-shaped lugs or stops 8 against which the bar 6 of the lowermost or foremost carrier 5 rests, the other carriers resting one against the other, it being noted that the rails 4 in being inclined will cause the carriers to slide forwardly thereon by gravity. The carriers are thus brought adjacent the forward ends of the rails 4 against the stop 8.

Slidably carried by the inner or rear side of the front wall of the frame 1, is a vertically movable elevator 9 of U-shape, and having its limbs or arms slidable through guides 10 secured to the front wall of the frame. The upper ends of the elevator 9 are formed, as at 11, to receive the projecting ends of the slide carriers. The limbs of the elevator 9 are upon the outer or remote sides of the rails 4 between the stops 8 and front wall of the frame. The elevator 9 is normally lowered so that the ends 11 thereof are adjacent the stops 8 to receive the suspension bar 6 of the respective slide carrier.

As a means for intermittently reciprocating the elevator 9, a transverse wiper arm 13 has one end pivoted, as at 14, to the front wall of the frame adjacent one side edge thereof, and the lower or intermediate portion of the elevator 9 seats upon said arm 13. The arm 13 is bent on a compound curve, so as to properly operate the elevator 9, and this arm 13 is operated by a second wiper arm 15 carried by a rotatable horizontal shaft 16 terminally journaled to the front and back walls of the frame below the elevator. When the arm 15 is rotated, it raises the arm 13, as illustrated in dotted lines in Fig. 2, and the arm 13 will therefore raise the elevator 9. Then, when the arm 15 leaves the arm 13, said arm 13 can drop to permit the elevator to gravitate to lowermost position, it being noted that there is an interval when the arm 15 is moving from one side to the other, when the arm 13 remains in lowered position. The elevator 9 is thus allowed to remain in lowermost position for a sufficient period of time to properly display the slide, and the elevator is then raised quickly and allowed to drop for substituting one slide by another.

The shaft 16 has a worm wheel 17 meshing with a worm 18 upon a shaft 19 journaled to the side members 18ᵃ of the frame, and a pulley wheel 20 secured upon the shaft 19 is belted, as at 21, to the pulley wheel 22 of an electric motor or other prime mover 23 mounted upon the bottom of the frame. This motor or prime mover 23 may be of any suitable character, for rotating the shaft 16 at the proper speed, so as to intermittently operate the elevator.

The mechanism embodies a second pair of rails 24 above the rails 4 and pivoted between their ends, as at 25, to side pieces or members 26 of the frame. The rails 24 are disposed between the side pieces 26 and are of triangular or tapered construction with their smaller or pointed ends projecting through the light opening in the rear wall of the frame in front of the lamp house 2. The forward or larger ends of the rails 24 are weighted, so as to normally swing downwardly for holding the rear ends of the arms of the rails 24 raised. The upper edges of the rails 24 are inclined reverse to the rails 4. The forward ends or weighted arms of the rails 24 are connected by a yoke 27 terminally attached thereto, and which has its limbs spaced outwardly from the upper edges of the rails 24. The forward ends of the rails 24 project into the path of the bar 6 of the slide carrier which is raised by the elevator 9, whereby the forward ends of the rails 24 will be swung upwardly to the dotted line position illustrated in Fig. 1, when the elevator is raised.

The lower or intermediate portion of the elevator 9 has a pair of rearwardly projecting lugs or fingers 28 engageable with the lower edges of that carrier 5 which rests against the stops 8 when the elevator is raised, to raise said carrier, so that its bar 6 passes over onto the stops or lugs 8.

The operation of the machine is as follows: Starting with the elevator 9 in lowermost position, with one carrier 5 upon the terminals of the elevator, when the elevator is raised by the arms 13—15, the bar 6 of the carrier carried by the elevator will strike the lower edges of the rails 24, and will swing the forward ends of said rails upwardly, until said bar passes said rails. When the elevator lowers, said bar is seated on the rails 24, and the carrier then slides rearwardly down the rails 24 against the rear wall of the frame in front of the lamp house. The slide is thus illuminated for the projection of the picture, printed matter, or the like upon the screen. When the elevator 9 is raised for carrying the respective slide carrier upwardly, the elevator in reaching its uppermost position, causes the fingers 28 to engage that carrier 5 which rests against the lugs 8, so that the bar 6 of said carrier is moved forwardly onto the lugs 8. This carrier will then slide against the elevator, and as soon as the elevator is returned to lowermost position the said carrier is moved over onto the elevator to be raised by the successive elevation of the elevator. In this manner, at each time the elevator is raised, it carries the successive slide upwardly onto the rails 24, and when the rails 24 are swung by the upward movement of the elevator, the rear ends of the rails 24 swing downwardly, and release the slide carrier which is upon the rear ends of the rails 24. The last mentioned carrier will then be deposited upon the rails 4, and will slide forwardly into place against the set of carriers carried by the rails 4. The slide carriers thus move in a circuitous path, they being presented one at a time automatically. The slide carriers may be readily removed from and applied to the rails 4 without interfering with the operation of the machine, so that the slides can be changed easily.

The present machine is not only useful for presenting stereopticon slides, but can also be employed to advantage for presenting during daylight series of placards, pictures, views, etc., which are the equivalent of slides, and whereby they are presented one at a time for observation.

Having thus described the invention, what is claimed as new is:—

1. In a slide presenting machine, a pair of inclined rails, a second pair of reversely inclined pivotally mounted rails above the aforesaid rails, a series of slide carriers between and slidably engaging the first mentioned rails, and means for elevating the slide carriers one at a time from the lower ends of the first mentioned rails onto the upper ends of the second mentioned rails, said means swinging the second mentioned rails when a slide carrier is being elevated to deposit a slide carrier from the lower ends of the second mentioned rails onto the upper ends of the first mentioned rails.

2. In a slide presenting machine, a pair of inclined rails, a second pair of reversely inclined rails pivotally mounted above the first mentioned rails, the second mentioned rails being pivotally mounted between their ends, a yoke connecting the second mentioned rails, a series of slide carriers suspended between and slidably engaging the first mentioned rails, and means for elevating the carriers one at a time from the lower ends of the first mentioned rails onto the upper ends of the second mentioned rails, said means swinging the upper ends of the second mentioned rails upwardly when a carrier is being elevated, so that a carrier upon the lower ends of the second mentioned rails is released and deposited upon the upper ends of the first mentioned rails.

3. In a slide presenting machine, a pair of inclined rails, a second pair of reversely inclined pivotally mounted rails above the first mentioned rails, a series of slide carriers slidably mounted upon the first mentioned rails, means for elevating the carriers one at a time from the lower end of the first mentioned rails so that the carriers engage and swing the second mentioned rails, the second mentioned rails being swung so that the carriers are deposited thereon, and so that a carrier upon the lower ends thereof is deposited upon the upper ends of the first mentioned rails.

4. In a slide presenting machine, a pair of inclined rails, a second pair of reversely inclined rails pivotally mounted between their ends above the first mentioned rails, a yoke connecting the second mentioned rails, a series of slide carriers disposed between the first mentioned rails and having portions to slide upon both pairs of rails, and means for elevating the slide carriers one at a time from the lower ends of the first mentioned rails so that they strike and raise the upper ends of the second mentioned rails, and so that the upper ends of the second mentioned rails swing under said portions of the carriers, the second mentioned rails when swung depositing a carrier from the lower ends thereof onto the upper ends of the first mentioned rails.

5. In a slide presenting machine, a pair of inclined rails, a second pair of reversely inclined rails pivotally mounted between their ends above the first mentioned rails, a series of slide carriers disposed between and slidably engaging the first mentioned rails and adapted to slidably engage the second mentioned rails, a vertically movable elevator adjacent the lower ends of the first mentioned rails, and means for operating the elevator, the elevator when lowered being adapted to receive one carrier from the first mentioned rails, and when raised to carry said carrier past the upper ends of the second mentioned rails so that the carrier is deposited upon the upper ends of the second mentioned rails, the second mentioned rails being swung when the elevator is raised to deposit a carrier from the lower ends of the second mentioned rails onto the upper ends of the first mentioned rails.

6. In a slide presenting machine, a frame having a pair of inclined rails between a pair of walls, a second pair of reversely inclined rails pivoted between their ends to the frame above the first mentioned rails, the lower ends of the second mentioned rails normally projecting through one of said walls, a vertically movable elevator carried by the other wall adjacent the lower ends of the first mentioned rails, a yoke connecting the second mentioned rails, and a series of slide carriers suspended between the first mentioned rails and having projecting portions slidable thereon and also slidable upon the second mentioned rails, and means for operating the elevator, the elevator when lowered being adapted to receive the projecting portions of one slide carrier from the lower ends of the first mentioned rails, and the elevator when raised serving to move the carrier against and past the upper ends of the second mentioned rails, whereby when the elevator is lowered, the carrier is deposited upon the upper ends of the second mentioned rails, the second mentioned rails being swung by the carrier elevated by the elevator so that a carrier upon the lower ends of the second mentioned rails is deposited upon the upper ends of the first mentioned rails.

7. In a slide presenting machine, a pair of inclined rails, a second pair of reversely inclined rails pivotally mounted between their ends above the first mentioned rails, a series of slide carriers disposed between and slidably engaging the first mentioned rails and adapted to slidably engage the second mentioned rails, a vertically movable elevator adjacent the lower ends of the first mentioned rails, a vertically movable elevator, the elevator when lowered being adapted to receive one carrier from the first mentioned rails, and when raised to carry said carrier past the upper ends of the second mentioned rails so that the carrier is deposited upon the upper ends of the second mentioned rails, the second mentioned rails being swung when the elevator is raised to deposit a carrier from the lower ends of the second mentioned rails onto the upper ends of the first mentioned rails, the first mentioned rails having upstanding V-shaped lugs at their lower ends, and the elevator having means whereby when it is raised it raises that carrier which rests against said lugs so that the projecting portions of said carrier are lifted onto said lugs to move against the elevator.

8. In a slide presenting machine, a frame having a pair of inclined rails between a pair of walls, a second pair of reversely inclined rails pivoted between their ends to the frame above the first mentioned rails, the lower ends of the second mentioned rails normally projecting through one of said walls, a vertically movable elevator carried by the other wall adjacent the lower ends of the first mentioned rails, a yoke connecting the second mentioned rails, a series of slide carriers suspended between the first mentioned rails and having projecting portions slidable thereon and also slidable upon the second mentioned rails, and means for operating the elevator, the elevator when lowered being adapted to receive the projecting portions of one slide carrier from the lower ends of the first mentioned rails, and the elevator when raised serving to move the carrier against and past the upper ends of the second mentioned rails, whereby when the elevator is lowered the carrier is deposited upon the upper ends of the second mentioned rails, the second mentioned rails being swung by the carrier elevated by the elevator so that a carrier upon the lower ends of the second mentioned rails is deposited upon the upper ends of the first mentioned rails, the first mentioned rails having upstanding V-shaped lugs at their lower ends, and the elevator having means whereby when it is raised it raises that carrier which rests against said lugs so that the projecting portions of said carrier are lifted onto said lugs to move against the elevator.

9. In a slide presenting machine, a pair of inclined rails, a second pair of reversely inclined rails pivotally mounted between their ends above the first mentioned rails, a series of slide carriers between the first mentioned rails and having portions slidably engaging them, a U-shaped elevator movable vertically adjacent the lower ends of the first mentioned rails and having means at its ends for receiving said portions of the carriers from the first mentioned rails, and means coöperable with the intermediate portion of the elevator for raising the elevator at intervals, the elevator when raised moving the respective carrier against and past the upper ends of the second mentioned rails, to swing the second mentioned rails and to deposit said carrier upon the upper ends of the second mentioned rails, the second mentioned rails when swung depositing a carrier from the lower ends thereof onto the upper ends of the first mentioned rails.

10. In a slide presenting machine, a frame having a pair of inclined rails between two walls, a second pair of reversely inclined rails pivoted between their ends to the frame above the first mentioned rails and having their lower ends normally projecting through one of said walls, a yoke connecting the second mentioned rails, the upper ends of the second mentioned rails being weighted, a U-shaped elevator adjacent the other wall, the last mentioned wall having guides in which the limbs of the elevator work, the lower ends of the first mentioned rails having upstanding V-shaped lugs, a series of slide carriers suspended between the first mentioned rails and having projecting portions slidable thereon and slidable upon the second mentioned rails, the terminals of the elevator having portions for receiving said projecting portions of the carriers, means for raising the elevator intermittently to move a carrier against and past the upper ends of the second mentioned rails, so as to swing the second mentioned rails and deposit said carrier upon the upper ends thereof, the second mentioned rails when swung depositing a carrier from the lower ends thereof onto the upper ends of the first mentioned rails, and means carried by the intermediate portion of the elevator for engaging and raising that carrier which rests against said lugs, to raise the projecting portions of said carrier onto said lugs so as to move against the elevator.

In testimony that I claim the foregoing as my own, I have hereto affixed my signature in the presence of two witnesses.

WALLACE C. JOHNSON.

Witnesses:
CHAS. E. GILBERT,
L. A. CRONHARDT.